UNITED STATES PATENT OFFICE.

MELCHIOR BÖNIGER, OF BASLE, SWITZERLAND, ASSIGNOR TO CHEMISCHE FABRIK, VORMALS SANDOZ, OF SAME PLACE.

BLUE-BLACK MIXED TRISAZO DYE.

SPECIFICATION forming part of Letters Patent No. 601,033, dated March 22, 1898.

Application filed July 31, 1897. Serial No. 646,693. (Specimens.) Patented in France June 4, 1896, No. 256,950, and in England July 10, 1896, No. 15,294.

*To all whom it may concern:*

Be it known that I, MELCHIOR BÖNIGER, chemist, residing at Basle, Switzerland, have invented new and useful Improvements in the Manufacture of Mixed Trisazo Coloring-Matters, of which the following is a specification, and for which patents have been obtained in France, No. 256,950, dated June 4, 1896, and in Great Britain, No. 15,294, dated July 10, 1896.

To the production of trisazo coloring-matters hitherto only the azo compounds formed from diazonaphtholsulfonic acids and metatoluylenediamin, metaämidoöxy or metadioxy benzene, or derivatives of 1.8 dioxynaphthalene have been used, as described in German patent specifications Nos. 84,546, 91,036, and 91,894 and in the French patent specification No. 243,735. In all these cases it has been distinctly stated that the diazo compounds of paradiamins combine with the benzene or the 1.8 dioxynaphthalene group, but not with the residue of the diazonaphtholsulfonic acid. Now I have found that if the azo compounds from diazonaphtholsulfonic acids and a constituent capable of combining once only are used the further combination of such azo compound with a diazo group takes place in the residue of the diazonaphtholsulfonic acid. The best results have been obtained by using the azo color produced in acid solution from diazotized $beta_1$ $alpha_4$ amidonaphthol $beta_2$ $beta_3$ disulfonic acid (German patent No. 53,023) and alpha-naphthylamin. If a molecule of a diazotized paradiamin is permitted to act upon one molecule of this color in an alkaline solution, an intermediate product is obtained the composition of which is expressed by the general formula:

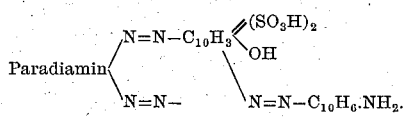

This intermediate product can be further combined with one molecule of a phenol, amin, amidonaphthol, or their sulfonic or carbonic acids, producing new and valuable mixed trisazo coloring-matters. Especially those members of this series containing as a second constituent an amidonaphtholsulfonic acid are of great value. They dye unmordanted cotton blue to violet-black and are suitable for further diazotization and combination on the fiber, by which process very dark-blue to black shades, fast to washing, are produced.

In carrying out my invention I proceed as follows:

Example I: 34.2 kilos of the acid sodium salt of $beta_1$ $alpha_4$ amidonaphthol $beta_2$ $beta_3$ disulfonic acid are diazotized in the well-known manner with 6.9 kilos of sodium nitrite, and the diazonaphtholsulfonic acid, suspended in about five hundred liters of water, is combined with 14.3 kilos of alpha-naphthylamin dissolved in twelve kilos of hydrochloric acid of 21° Baumé and three hundred liters of water. The azo coloring-matter separates almost entirely as a brownish-violet powder, which after twenty-four hours is dissolved by the addition of eight kilos of caustic soda. Thirty kilos of sodium carbonate are added to this solution, and then at a temperature of about 10° centigrade there is added a solution of tetrazo-diphenyl prepared in the well-known manner from 18.4 kilos of benzidin. An intermediate product separates immediately as a blackish-violet precipitate, to which there is added a solution containing 23.9 kilos of gamma-amidonaphtholsulfonic acid and four kilos of caustic soda in five hundred liters of water, care being taken to stir well all the time. The combination is finished after about twenty-four hours, and the coloring-matter, which separates as a bluish-black powder, is filtered cold and dried. It is easily soluble with violet-black color in hot water, dyes unmordanted cotton from a bath containing salt and rendered slightly alkaline a deep violet black. The aqueous solution of the new coloring-matter turns into reddish violet by addition of a little caustic soda. An excess of caustic soda, however, and, on the other side, also an addition of mineralic acids, precipitate a bluish-black powder.

Example II: If the intermediate product obtained as described under the preceding example from 18.4 kilos of diazotized benzidin and the azo coloring-matter from $beta_1$ $alpha_4$ amidonaphthol $beta_2$ $beta_3$ disulfonic acid and alpha-naphthylamin is combined in an alkaline solution of soda with the solution of 34.2 kilos of $alpha_1$ $alpha_4$ amidonaphthol $beta_2$ $beta_3$ disulfonic acid (acid sodium salt of one hundred per cent.) in four kilos of caustic soda and five hundred liters of water, there is formed another new coloring-matter, which after twenty-four hours' standing is boiled off, precipitated by addition of three hundred kilos of common salt, filtered, and dried. It is very easily soluble in hot water with bluish-black color and dyes unmordanted cotton from a bath containing soda and salt in blue to blue-black shades.

Example III: The intermediate product obtained as described under Examples I and II can also be combined in a soda-alkaline solution with the solution of 23.9 kilos of $alpha_1$ $alpha_4$ amidonaphthol $alpha_2$ sulfonic acid in four kilos of caustic soda and five hundred liters of water. After twenty-four hours' standing the new coloring-matter is boiled off, precipitated by addition of two hundred kilos of common salt, filtered, and dried. It dyes unmordanted cotton a deep blue-black.

Similar dyestuffs are obtained by substitution of the benzidin by analogous bodies, as tolidin, dianisidin, ethoxybenzidin, diamido phenylamin, &c. The new coloring-matters produced as set forth are nearly insoluble in ethylic alcohol. They dissolve in strong sulfuric acid with blue color, from which solution they are precipitated by water. Reducing agents, such as protochlorid of tin or zinc-dust, destroy them, forming benzidin, besides 1.4 naphthalene diamin and easily-soluble sulfo-acids of the naphthalene series.

Having thus described and ascertained the nature of my said invention, I declare that what I claim, and desire to secure by Letters Patent, is—

1. The process for the production of mixed trisazo coloring-matters, which consists in combining in an alkaline solution one molecule of the simple azo color obtained in acid solution from diazotized $beta_1$ $alpha_4$ amidonaphthol $beta_3$ $beta_3$ disulfonic acid and alpha-naphthylamin with one molecule of tetrazodiphenyl and by further combining this intermediate product with one molecule of an amidonaphtholsulfonic acid, substantially as herein described.

2. The process for the production of mixed trisazo coloring-matters, which consists in combining in an alkaline solution one molecule of the simple azo color obtained in said solution from diazotized $beta_1$ $alpha_4$ amidonaphthol $beta_2$ $beta_3$ disulfonic acid and alpha-naphthylamin with one molecule of tetrazodiphenyl and by further combining this intermediate product with one molecule of gamma-amidonaphtholsulfonic acid, substantially as herein described.

3. As new products, the mixed trisazo coloring-matters herein described of the general formula:

$$\text{Benzidin} \begin{cases} \text{Beta}_1 \text{ alpha}_4\text{--amidonaphthol beta}_2 \text{ beta}_3 \text{ disulfonic acid--alpha-naphthylamin} \\ \text{Amidonaphtholsulfonic acid,} \end{cases}$$

being soluble in strong sulfuric acid with a blue color, almost insoluble in ethyl alcohol, and forming by reducing agents benzidin, 1.4 naphthalenediamin and easily-soluble sulfo-acids of the naphthalene series.

In testimony whereof I have signed my name to this specification in the presence of two subscribing witnesses.

MELCHIOR BÖNIGER.

Witnesses:
ARNOLD GREINER,
EDUARD SIDLER.